US008095416B2

(12) United States Patent
Harvey et al.

(10) Patent No.: US 8,095,416 B2
(45) Date of Patent: Jan. 10, 2012

(54) METHOD, SYSTEM, AND COMPUTER PROGRAM PRODUCT FOR THE DYNAMIC GENERATION OF BUSINESS INTELLIGENCE ALERT TRIGGERS

(75) Inventors: Richard A. Harvey, Hingham, MA (US); Mark S. Ramsey, Kihei, HI (US)

(73) Assignee: International Business Machines Corporation, Armonk, NY (US)

( * ) Notice: Subject to any disclaimer, the term of this patent is extended or adjusted under 35 U.S.C. 154(b) by 1688 days.

(21) Appl. No.: 11/385,287

(22) Filed: Mar. 21, 2006

(65) Prior Publication Data

US 2007/0226024 A1     Sep. 27, 2007

(51) Int. Cl.
*G06Q 10/00* (2006.01)
(52) U.S. Cl. .................. 705/7.39; 705/7.11; 705/7.38
(58) Field of Classification Search .............. 705/7–12
See application file for complete search history.

(56) References Cited

U.S. PATENT DOCUMENTS

| | | | | |
|---|---|---|---|---|
| 5,646,408 | A * | 7/1997 | Goldberg et al. | 250/363.07 |
| 5,692,181 | A * | 11/1997 | Anand et al. | 1/1 |
| 5,991,696 | A * | 11/1999 | McAndrew | 702/24 |
| 2002/0038228 | A1 * | 3/2002 | Waldorf et al. | 705/7 |
| 2002/0174005 | A1 * | 11/2002 | Chappel | 705/10 |
| 2003/0018241 | A1 * | 1/2003 | Mannheimer | 600/300 |

OTHER PUBLICATIONS

Whiting, Rick. Business Intelligence: Feasible or Feeblee. Mar. 18, 2002. Information Week.*
Verilystics Website. Feb. 20, 2001. http://web.archive.org/web/20010220161338/http://www.verilytics.com/.*
Verilytics corporate portals Letter. Mar. 2001. http://www.verilytics.com/extras/CorporatePortalsLetterMarch_2001.pdf.*
Newswire article. Verilytics Launches New Analysis Engine at Securities Industry Association Trade Show. Jun. 20, 2001. http://www.thefreelibrary.com/_/print/PrintArticle.as;c?id=75664130.*
Verilytics Announces Supply Chain Manager. Dec. 6, 2001. http://license.icopyright.net/user/viewFreeUse.act?fuid=MTExMDQ4OTM%3D.*
Erlinger, Leon. Monitoring Your Business in Real Time. Jul. 26, 2004. Infoworld. 26, 30. p. 43-47.*
Businesswire. Computech Joins Verilytics Partners Program; Jan. 7, 2002.*
Celequest Website on Celequest Activity Suite. Oct. 4, 2003. http://web.archive.org/web/20031004144451/www.celequest.com/products/cas_ovrw.asp.*
Variar, Ganesh. Make the Leap to Real-time Decision Making. Jan. 2006. Intelligent Enterprises. http://www.intelligententerprise.com/showarticle.jhtml?articleID=175002451.*
PR Newswire. Celequest Announces First Operational Dashboards for Instant Business Visibility Based on ITs Award Winning BAM Technology. Apr. 19, 2004.*
White, Colin. Building the Real-Time Enterprise. 2003. The Dasta Warehousing Institute.* The Celequest Information Sheet on celequest 2.0 Activity Suite. Jul. 7, 2003. http://web.archive.org/web/20030707205419/http://www.celequest.com/products/celequest2_activity_suite.pdf.*
Celequest Activity Suite Whitepaper. BAM: Bringing Business Intelligence to the Real-Time Enterprise. 2003.*
Celequest Whitepaper. Introducing the Celequest Activity Suite 2.0. 2003.*

* cited by examiner

*Primary Examiner* — Shahid Merchant
*Assistant Examiner* — Stephanie M Ziegle
(74) *Attorney, Agent, or Firm* — Anna Linne; Hoffman Warnick LLC

(57) ABSTRACT

The present invention provides a method, system, and computer program product for dynamically generating business intelligence alert triggers. A method in accordance with an embodiment of the present invention includes: identifying an attribute; monitoring data values associated with the attribute; analyzing the data values to establish a baseline value; generating a trigger value based on a variance from the baseline value; and repeating the monitoring, analyzing and generation steps to dynamically refine the baseline value and the trigger value based on new data values.

7 Claims, 2 Drawing Sheets

METHOD, SYSTEM, AND COMPUTER PROGRAM PRODUCT FOR THE DYNAMIC GENERATION OF BUSINESS INTELLIGENCE ALERT TRIGGERS

FIELD OF THE INVENTION

The present invention generally relates to business intelligence, and more specifically relates to a method, system, and computer program product for the dynamic generation of business intelligence alert triggers using historical data values.

BACKGROUND OF THE INVENTION

Many organizations use business intelligence software to trigger specific actions when defined conditions occur. For example, an email alert may be sent to a sales manager of a company if sales during a given period fall below a specified trigger level, or to a claims manager of an insurance company if the number of claims filed during a given period exceeds a specified trigger level.

Alert trigger levels are typically set by a business analyst or a subject matter expert based on a knowledge of the associated business. In the claims scenario described above, for example, the claims manager may set a trigger level that is 5% higher than the past month's average number of filed claims to trigger an alert email.

Although current business intelligence software applications have the ability to set trigger levels, in all cases, the trigger values are manually set and/or "hard-coded" based on a static analysis of data or from subject matter experience. Unfortunately, the ongoing maintenance of such trigger values is very time consuming and manually intensive.

SUMMARY OF THE INVENTION

In general, the present invention provides a method, system, and computer program product for the dynamic generation of business intelligence alert triggers using historical data values. Trigger levels for alerts are generated using actual historical data, and are kept current and refined over time, thereby eliminating the need for, and the delay associated with, the manual maintenance of trigger values.

A first aspect of the present invention is directed to a method for dynamically generating a business intelligence alert trigger, comprising: identifying an attribute; monitoring data values associated with the attribute; analyzing the data values to establish a baseline value; generating a trigger value based on a variance from the baseline value; and repeating the monitoring, analyzing and generation steps to dynamically refine the baseline value and the trigger value based on new data values.

A second aspect of the present invention is directed to a system for dynamically generating a business intelligence alert trigger, comprising: a system for monitoring data values associated with an attribute; a system for analyzing the data values to establish a baseline value; a system for generating a trigger value based on a variance from the baseline value; a system for controlling the monitoring, analyzing, and generating systems to dynamically refine the baseline value and the trigger value based on new data values.

A third aspect of the present invention is directed to a program product stored on a computer readable medium for dynamically generating a business intelligence alert trigger, the computer readable medium comprising program code for performing the following steps: identifying an attribute; monitoring data values associated with the attribute; analyzing the data values to establish a baseline value; generating a trigger value based on a variance from the baseline value; and repeating the monitoring, analyzing and generation steps to dynamically refine the baseline value and the trigger value based on new data values.

A fourth aspect of the present invention is directed to a method for deploying an application for dynamically generating a business intelligence alert trigger, comprising: providing a computer infrastructure being operable to: identify an attribute; monitor data values associated with the attribute; analyze the data values to establish a baseline value; generate a trigger value based on a variance from the baseline value; and repeat the monitoring, analyzing and generation steps to dynamically refine the baseline value and the trigger value based on new data values.

A fifth aspect of the present invention is directed to computer software embodied in a propagated signal for dynamically generating a business intelligence alert trigger, the computer software comprising instructions to cause a computer system to perform the functions of: identifying an attribute; monitoring data values associated with the attribute; analyzing the data values to establish a baseline value; generating a trigger value based on a variance from the baseline value; and repeating the monitoring, analyzing and generation steps to dynamically refine the baseline value and the trigger value based on new data values.

BRIEF DESCRIPTION OF THE DRAWINGS

These and other features of this invention will be more readily understood from the following detailed description of the various aspects of the invention taken in conjunction with the accompanying drawings in which.

Figure 1:
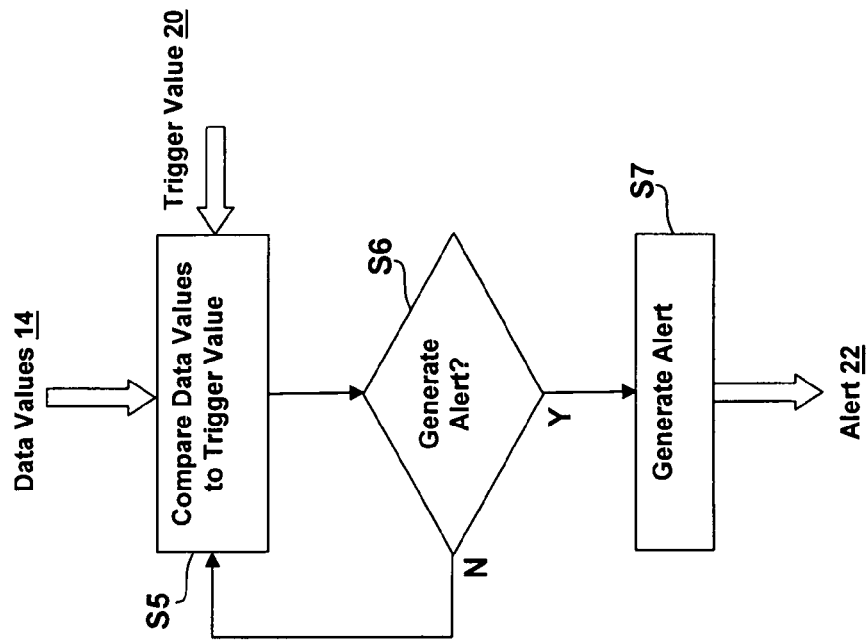
FIG. 1 depicts an illustrative flow diagram of a method in accordance with an embodiment of the present invention.
Figure 1:
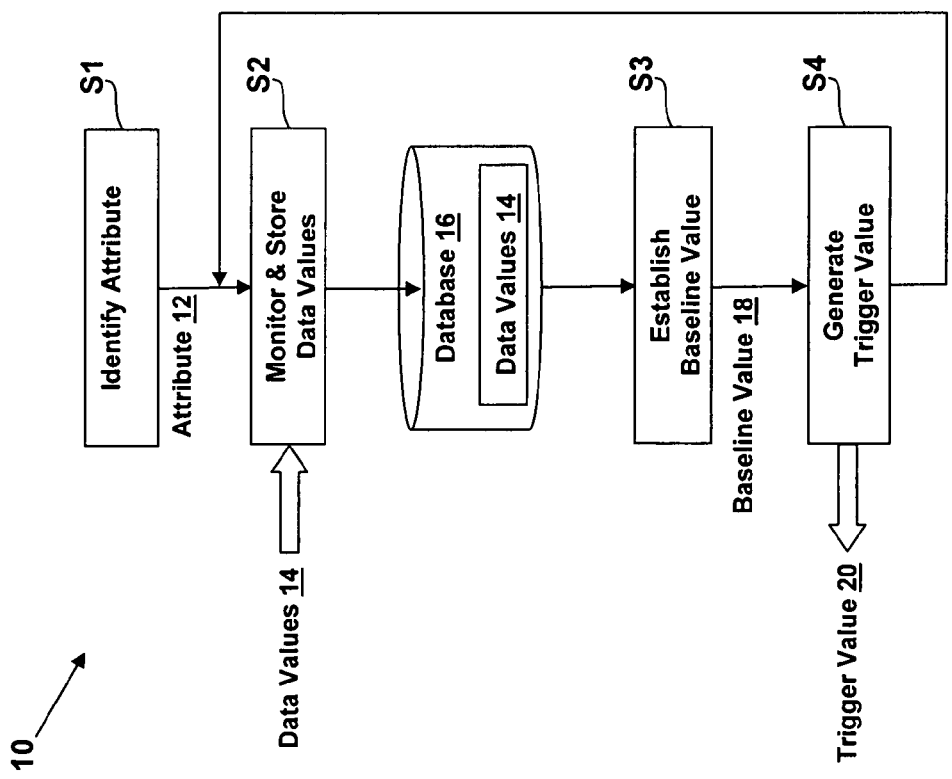

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for the dynamic generation of business intelligence alert triggers using historical data values. Trigger levels for alerts are generated using actual historical data, and are kept current and refined over time, thereby eliminating the need for, and the delay associated with, the manual maintenance of trigger values.

An illustrative flow diagram 10 of a method in accordance with an embodiment of the present invention is depicted in FIG. 1.

In step S1, an attribute 12 to be monitored is identified. The attribute 12 can comprise, for example, customer complaints, sales volumes, insurance claims, telephone calls, etc. Many other types of attributes 12, which are typically business-specific, are also possible. In step S2, data values 14 associated with the attribute 12 identified in step S1 are monitored and stored in a database 16.

In step S3, the data values 14 stored in the database 16 are analyzed to establish a baseline value 18 for the attribute 12.

The baseline value 18 can be established, for example, using the mean of the data values 14, the average of the data values 14, the minimum or maximum of the data values 14, etc. The appropriate method for setting the baseline value 18 will generally be determined by the type of attribute 12 being monitored. For example, in the case of an attribute 12 such as a sales volume, using the average method might be suitable. The baseline value 18 can also be more advanced. For example, the baseline value 18 can be set using the average method for the same month across time. This would address issues such as cyclical sales volumes.

In step S4, a trigger value 20 for the attribute 12 is generated as a variance from the baseline value 18. For example, the trigger value 20 can be generated by calculating the standard deviation of the data values 12 from the mean over a specified historical period. The specified historical period can be the entire period of time during which the data values 12 have been monitored, or a portion thereof. In addition to standard deviation, other methods can be used to generate the trigger value 20. Such methods can include, for example, % growth relative to the baseline value 18, specific value away from the baseline value 18, comparison to MIN/MAX, and the like.

After generating the trigger value 20 in step S4, flow passes back to step S2 where the processes of establishing the baseline value 18 and generating the trigger value 20 are repeated using new data values 14 of the attribute 12 together with historical data values 14 of the attribute 12 stored in the database 16. In this way, as the historical period grows (e.g., from several months to several years), the baseline value 18 and the trigger value 20 are automatically and dynamically refined. Thus, as more data values 12 are captured, the baseline value 18 and trigger value 20 "self-tune" themselves and remain current over time. This eliminates the need and delay associated with the manual maintenance of trigger values.

The trigger value 20 generated in step S4 is compared to the monitored data values 12 in step S5. In step S6, based on the results of the comparison in step S5, a decision is made regarding the need to generate an alert 22. If yes, an alert 22 is generated in step S7. If not, flow passes back to step S5.

Baseline values 18 can be generated directly by the database 16 using a summary database table. Advanced relational databases, such as DB2 from IBM, have the ability to determine the standard deviation across the rows of a summary database table using an aggregate function. If methods other than standard deviation are used to establish the baseline value 18, either a built-in database function (if available) or a user-defined function can be used. Once created, the database summary table is maintained and updated as necessary by the database 16 as additional data values 12 are added. Such relational databases also have the ability to capture and maintain trigger values 20 over time (e.g., using a materialized query table (MQT).

Figure 2:
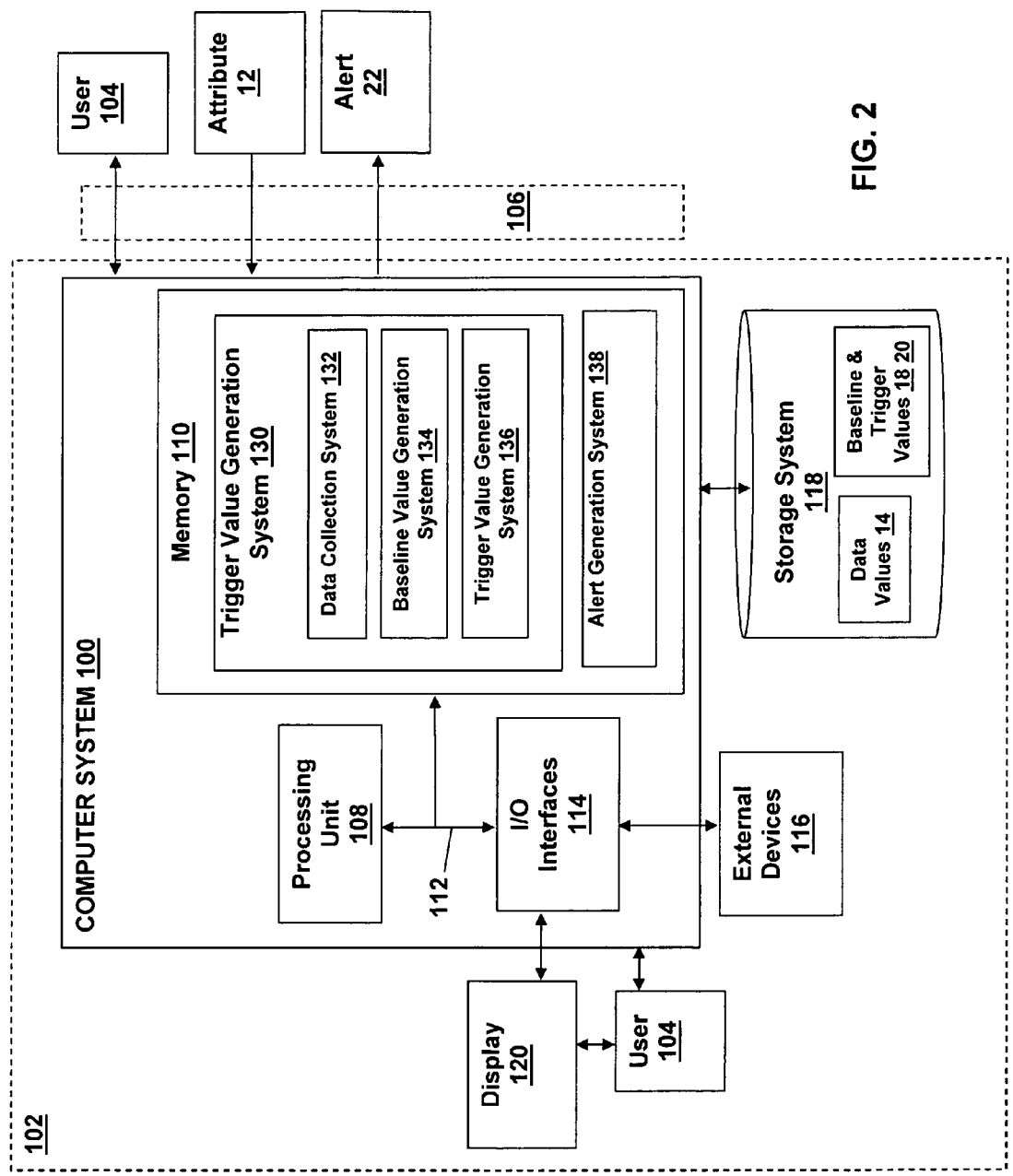
FIG. 2 depicts an illustrative computer system for implementing embodiment(s) of the present invention.

A computer system 100 for the dynamic generation of business intelligence alert triggers using historical data values in accordance with an embodiment of the present invention is depicted in FIG. 2. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that offers a service for the dynamic generation of business intelligence alert triggers using historical data values in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as trigger value generation system 130, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 2 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention, such as data values 12, baseline values 18, trigger values 20, etc. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is a trigger value generation system 130 for the dynamic creation of business intelligence alert triggers using historical data values in accordance with the present invention. The trigger value generation system 130 includes a data collection system 132 for monitoring data values 14 associated with an attribute 12 and for storing the data values 14 in the storage system 118 (i.e., in a database). Also included in the trigger value generation system 130 is a baseline value generation system 134 for analyzing the data values 14 stored in the storage system 118 to establish a baseline value 18 for the attribute 12, and a trigger value generation system 136 for generating a trigger value 20 based on a variance of monitored data values 14 from the baseline value 18. The baseline and trigger values 18, 20 are stored in the storage system 118 and are automatically refined over time as described above.

An alert generation system 138 is also provided in the memory 110. The alert generation system 138 is configured to compare monitored data values 14 to the generated trigger value 20 and to generate an alert 22 if necessary.

The present invention can be offered as a business method on a subscription or fee basis. For example, one or more components of the present invention can be created, maintained, supported, and/or deployed by a service provider that offers the functions described herein for customers. That is, a service provider can be used to provide a service for the dynamic generation of business intelligence alert triggers using historical data values, as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for dynamically generating a business intelligence alert trigger, comprising:
   identifying a business attribute;
   monitoring, using a computer system, data values associated with the business attribute;
   analyzing, using the computer system, the data values associated with the business attribute to establish a baseline value of the business attribute;
   generating, using the computer system, a trigger value based on a variance from the baseline value of the business attribute;
   repeating the monitoring, analyzing and generating to dynamically update the baseline value of the business attribute and the trigger value based on new data values and historical data values associated with the business attribute;
   comparing, using the computer system, the data values associated with the business attribute to the trigger value; and
   selectively generating, using the computer system, an alert based on the comparison;
   wherein the generating, using the computer system, the trigger value based on the variance from the baseline value comprises performing, using the computer system, a statistical analysis of the data values associated with the business attribute relative to the baseline value over a historical period;
   wherein the historical period comprises an entire period of time during which the data values have been analyzed.

2. The method of claim 1, further comprising:
   storing the data values associated with the business attribute in a database; and
   analyzing, using the computer system, the data values associated with the business attribute stored in the database to establish the baseline value of the business attribute.

3. The method of claim 1, wherein the analyzing, using the computer system, the data values to establish the baseline value further comprises:
   performing a statistical analysis of the data values.

4. A computer system for dynamically generating a business intelligence alert trigger, comprising:
at least one computer device including:
a data collection system for:
monitoring data values associated with a business attribute;
a baseline value generation system for:
analyzing the data values associated with the business attribute to establish a baseline value of the business attribute,
generating a trigger value based on a variance from the baseline value of the business attribute, and
repeating the monitoring, analyzing and generating to dynamically update the baseline value of the business attribute and the trigger value based on new data values and historical data values associated with the business attribute;
a trigger value generation system for:
comparing the data values associated with the business attribute to the trigger value and
selectively generating an alert based on the comparison,
wherein the analyzing the data values associated with the business attribute to establish a baseline value of the business attribute comprises performing a statistical analysis of the data values associated with the business attribute relative to the baseline value over a historical period;
wherein the historical period comprises an entire period of time during which the data values have been analyzed.

5. The computer system of claim 4, further comprising:
the data collection system storing the data values associated with the business attribute in a database; and
the baseline value generation system analyzing the data values associated with the business attribute stored in the database to establish the baseline value.

6. The computer system of claim 4, wherein the analyzing the data values to establish the baseline value further comprises:
performing a statistical analysis of the data values.

7. A program product stored on a computer readable storage device for dynamically generating a business intelligence alert trigger, the computer readable medium comprising program code for performing the steps of:
identifying a business attribute; monitoring data values associated with the business attribute;
analyzing the data values associated with the business attribute to establish a baseline value of the business attribute;
generating a trigger value based on a variance from the baseline value of the business attribute;
repeating the monitoring, analyzing and generating to dynamically update the baseline value of the business attribute and the trigger value based on new data values and historical data values associated with the business attribute;
comparing the data values associated with the business attribute to the trigger value; and
selectively generating an alert based on the comparison;
wherein the analyzing the data values associated with the business attribute to establish a baseline value of the business attribute comprises performing a statistical analysis of the data values associated with the business attribute relative to the baseline value over a historical period;
wherein the historical period comprises an entire period of time during which the data values have been analyzed.

* * * * *